United States Patent
Kato

(10) Patent No.: US 9,557,914 B2
(45) Date of Patent: Jan. 31, 2017

(54) ELECTRONIC DEVICE, UNLOCKING METHOD, AND NON-TRANSITORY STORAGE MEDIUM

(71) Applicant: NEC CASIO Mobile Communications, Ltd, Kawasaki-shi, Kanagawa (JP)

(72) Inventor: Hiromu Kato, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/443,428

(22) PCT Filed: Jun. 14, 2013

(86) PCT No.: PCT/JP2013/066439
§ 371 (c)(1),
(2) Date: May 18, 2015

(87) PCT Pub. No.: WO2014/080659
PCT Pub. Date: May 30, 2014

(65) Prior Publication Data
US 2015/0324557 A1   Nov. 12, 2015

(30) Foreign Application Priority Data

Nov. 22, 2012 (JP) ................................. 2012-256766

(51) Int. Cl.
*G06F 21/30* (2013.01)
*G06F 3/0488* (2013.01)
(Continued)

(52) U.S. Cl.
CPC ........... *G06F 3/04886* (2013.01); *G06F 21/30* (2013.01); *G06F 21/32* (2013.01); *G06F 21/36* (2013.01); *H04M 1/67* (2013.01)

(58) Field of Classification Search
CPC ...... G06F 21/30; G06F 3/04886; G06F 3/048; G06F 3/0488; G06F 3/041; G06F 21/31; G06F 13/385; G06F 21/606; G06F 21/83; G06F 21/82; G07C 9/00111; G07C 2009/00769; H04M 1/67; H04M 1/7253
(Continued)

(56) References Cited

U.S. PATENT DOCUMENTS 8,230,127 B2 * 7/2012 Kim ...................... G06F 13/385
710/15
8,312,991 B2 * 11/2012 Diebel ................... A45C 11/00
206/305
(Continued)

FOREIGN PATENT DOCUMENTS

CN         101587398 A      11/2009
CN         102147679 A       8/2011
(Continued)

OTHER PUBLICATIONS

International Search Report for PCT Application No. PCT/JP2013/066439, mailed on Jul. 9, 2013.
(Continued)

*Primary Examiner* — Thanhnga B Truong

(57) ABSTRACT

An object is to provide a technology for preventing content of an unlocking operation from being easily recognized by another person even when the unlocking operation is seen by the other person. In order to achieve the object, there is provided an electronic device (10) including an input reception unit (11) that receives an input from a user through an operation to indicate a predetermined region using a predetermined object, and a lock unit (12) that locks a predetermined function, and unlocks the lock when the input reception unit (11) receives an input caused by a first operation and an input caused by a second operation in parallel.

12 Claims, 12 Drawing Sheets

(51) Int. Cl.
*H04M 1/67* (2006.01)
*G06F 21/32* (2013.01)
*G06F 21/36* (2013.01)

(58) Field of Classification Search
USPC . 726/4, 16, 17, 21; 713/1, 2, 100; 340/5.64,
340/1.1, 5.61, 5.62; 345/156, 173; 710/15;
70/58
See application file for complete search history.

(56) References Cited

U.S. PATENT DOCUMENTS

| | | | |
|---|---|---|---|
| 8,402,533 B2 * | 3/2013 | LeBeau | G06F 3/048 |
| | | | 726/17 |
| 8,473,870 B2 | 6/2013 | Hinckley et al. | |
| 8,564,402 B2 * | 10/2013 | Saotome | G07C 9/00111 |
| | | | 340/1.1 |
| 8,640,040 B2 * | 1/2014 | Lundy | G06F 3/0237 |
| | | | 715/772 |
| 8,760,422 B2 | 6/2014 | Ikeda | |
| 8,847,903 B2 * | 9/2014 | Stokes | G06F 21/31 |
| | | | 345/156 |
| 2005/0229007 A1 | 10/2005 | Bolle et al. | |
| 2007/0229221 A1 | 10/2007 | Saotome | |
| 2009/0249240 A1 | 10/2009 | Lundy et al. | |
| 2009/0289916 A1 | 11/2009 | Dai et al. | |
| 2010/0097324 A1 | 4/2010 | Anson et al. | |
| 2011/0209103 A1 | 8/2011 | Hinckley et al. | |
| 2012/0113061 A1 | 5/2012 | Ikeda | |
| 2012/0174044 A1 | 7/2012 | Koga et al. | |

FOREIGN PATENT DOCUMENTS

| | | |
|---|---|---|
| CN | 102385449 A | 3/2012 |
| CN | 102473073 A | 5/2012 |
| CN | 102681760 A | 9/2012 |
| EP | 2474896 A2 | 11/2011 |
| JP | 2003-058302 A | 2/2003 |
| JP | 2011-048665 A | 3/2011 |
| JP | 2012-095069 A | 5/2012 |
| JP | 2012-141868 A | 7/2012 |

OTHER PUBLICATIONS

Extended European Search Report for EP Application No. EP13856639.3 dated Apr. 19, 2016.

Ohinese Office Action for Cn Application No. 201380061215.8 mailed on Nov. 1, 2016 with English Translation.

* cited by examiner

FIG. 4
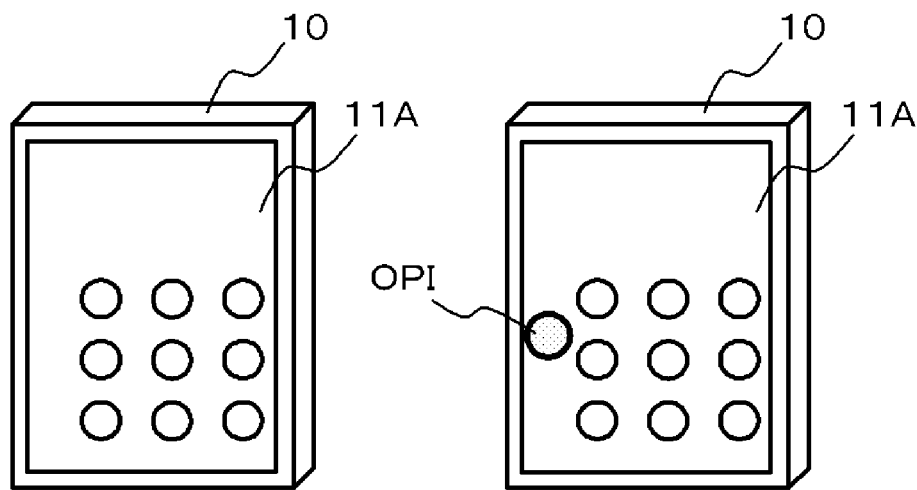
(A)  (B)
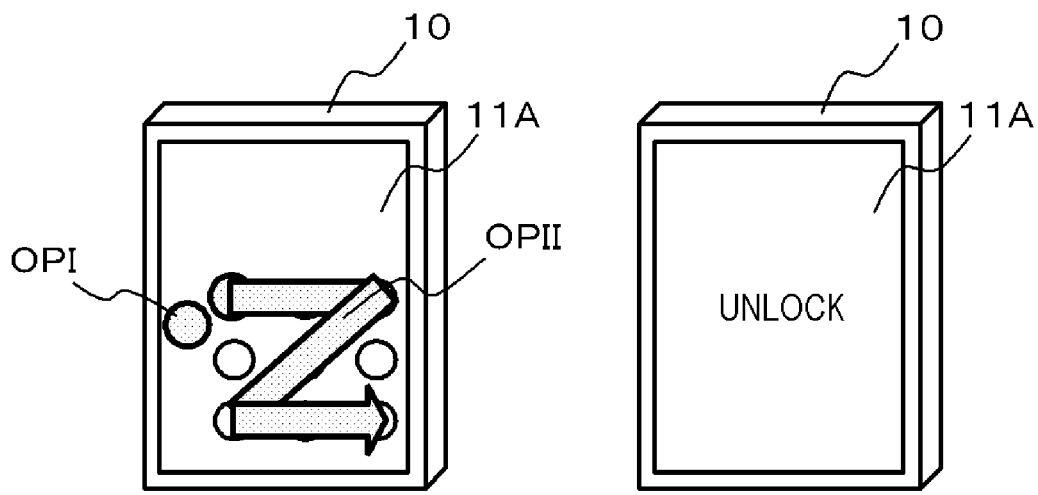
(C)  (D)

FIG. 10
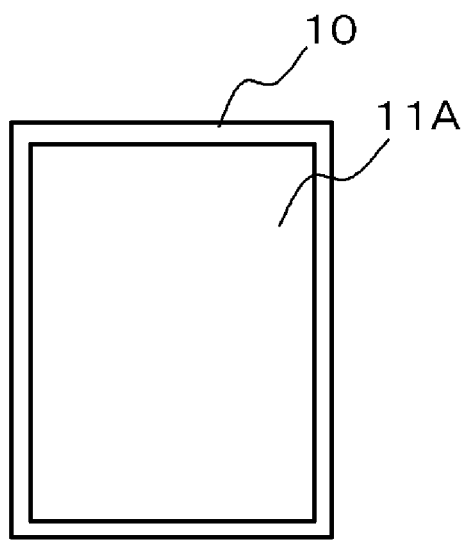
(A)
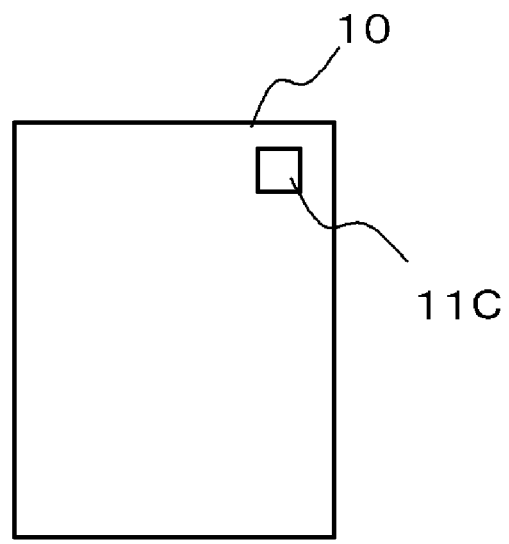
(B)

ELECTRONIC DEVICE, UNLOCKING METHOD, AND NON-TRANSITORY STORAGE MEDIUM

This application is a National Stage Entry of PCT/JP2013/066439 filed on Jun. 14, 2013, which claims priority from Japanese Patent Application 2012-256766 filed on Nov. 22, 2012, the contents of all of which are incorporated herein by reference, in their entirety.

TECHNICAL FIELD

The present invention relates to an electronic device, an unlocking method, and a program.

BACKGROUND ART

Patent Documents 1 and 2 disclose a means for unlocking a lock set in a portable terminal apparatus.

Patent Document 1 discloses an unlocking means for unlocking a lock when a touch operation with respect to a touch input key "Unlock" is performed with a touch pen 8 in a state in which a complex operation key 9 is pressed in a portable terminal apparatus illustrated in FIG. 12 (citing FIG. 2 of Patent Document 1).

Patent Document 2 discloses an unlocking means for unlocking a lock by touching an object displayed on a touch panel display with a finger, and then, sliding the finger in a predetermined direction without lifting it.

Further, an unlocking means for unlocking a lock when an input of a predetermined password is received is well known.

RELATED DOCUMENT

Patent Document

[Patent Document 1] Japanese Unexamined Patent Publication No. 2003-58302
[Patent Document 2] Japanese Unexamined Patent Publication No. 2012-95069

DISCLOSURE OF THE INVENTION

In the case of the conventional unlocking means as described above, when an unlocking operation is seen by another person and content of the operation is recognized by the other person, the other person becomes able to unlock the lock. That is, the lock may be unlocked by the other person without permission, and an electronic device may be used without permission.

In the case of a technology described in Patent Document 1, the lock is unlocked by two operations, "the touch operation with respect to the touch input key 'Unlock' is performed with the touch pen 8 in a state in which the complex operation key 9 is pressed." However, since the complex operation key 9 and a touch panel input device 7 are arranged to be simultaneously visible as illustrated in FIG. 12, content of an unlocking operation including the two operations may be recognized by another person when the unlocking operation is seen by the other person.

An object of the present invention is to provide a technology for preventing content of an unlocking operation from being easily recognized by another person even when the unlocking operation is seen by the other person.

According to the present invention,
there is provided an electronic device including:
an input reception unit that receives an input through an operation to indicate a predetermined region using a predetermined object; and
a lock unit that locks a predetermined function, and unlocks the lock when the input reception unit receives an input caused by a first operation and an input caused by a second operation in parallel.

Further, according to the present invention,
there is provided an electronic device, including:
an input reception unit that receives an input through a first input device and a second input device provided in positions which are not simultaneously visible; and
a lock unit that locks a predetermined function, and unlocks the lock when the input reception unit receives an input caused by a first operation through the first input device and an input caused by a second operation through the second input device in parallel.

Further, according to the present invention,
there is provided a program for causing a computer to function as:
an input reception unit that receives an input through an operation to indicate a predetermined region using a predetermined object; and
a lock unit that locks a predetermined function, and unlocks the lock when the input reception unit receives an input caused by a first operation and an input caused by a second operation in parallel.

Further, according to the present invention,
there is provided a program for causing a computer to function as:
an input reception unit that receives an input through a first input device and a second input device provided in positions which are not simultaneously visible; and
a lock unit that locks a predetermined function, and unlocks the lock when the input reception means receives an input caused by a first operation through the first input device and an input caused by a second operation through the second input device in parallel.

Further, according to the present invention,
there is provided an unlocking method in which a computer executes:
an input reception step of receiving an input through an operation to indicate a predetermined region using a predetermined object; and
an unlocking step of locking a predetermined function, and unlocking the lock when an input caused by a first operation and an input caused by a second operation are received in parallel in the input reception step.

Further, according to the present invention,
there is provided an unlocking method in which a computer executes:
an input reception step of receiving an input through a first input device and a second input device provided in positions which are not simultaneously visible; and
an unlocking step of locking a predetermined function, and unlocking the lock when an input caused by a first operation through the first input device and an input caused by a second operation through the second input device are received in parallel in the input reception step.

According to the present invention, it is possible to prevent the content of an unlocking operation from being easily recognized by another person even when the unlocking operation is seen by the other person.

BRIEF DESCRIPTION OF THE DRAWINGS

The above-described object, other objects, characteristics, and advantages become further apparent from preferred exemplary embodiments to be described below, and the following drawings associated with the exemplary embodiments.

FIGS. 4(A)-(D) are diagrams illustrating an unlocking operation in this exemplary embodiment.

FIGS. 10(A)-(B) show an example of a schematic plan view of an electronic device of this exemplary embodiment.

DESCRIPTION OF EXEMPLARY EMBODIMENTS

Hereinafter, exemplary embodiments of the present invention will be described using the drawings.

Further, a system or an apparatus of this exemplary embodiment is realized by an arbitrary combination of hardware and software, mainly including a CPU, a memory, a program loaded to the memory (including a program downloaded from a storage medium such as a CD, a server on the Internet, or the like, in addition to a program stored in the memory from a step of shipping the apparatus in advance), a storage unit such as a hard disk that stores the program, and an interface for network connection in an arbitrary computer. Also, it is understood by those skilled in the art that there are various modification examples of a method or an apparatus for realization.

Further, functional block diagrams used in description of this exemplary embodiment show blocks in function units rather than a configuration in hardware units. In these diagrams, each system or apparatus is described as being realized by one device, but realization means is not limited thereto. That is, each system or apparatus may have a physically divided configuration or may have a logically divided configuration.

First Exemplary Embodiment

Figure 1:
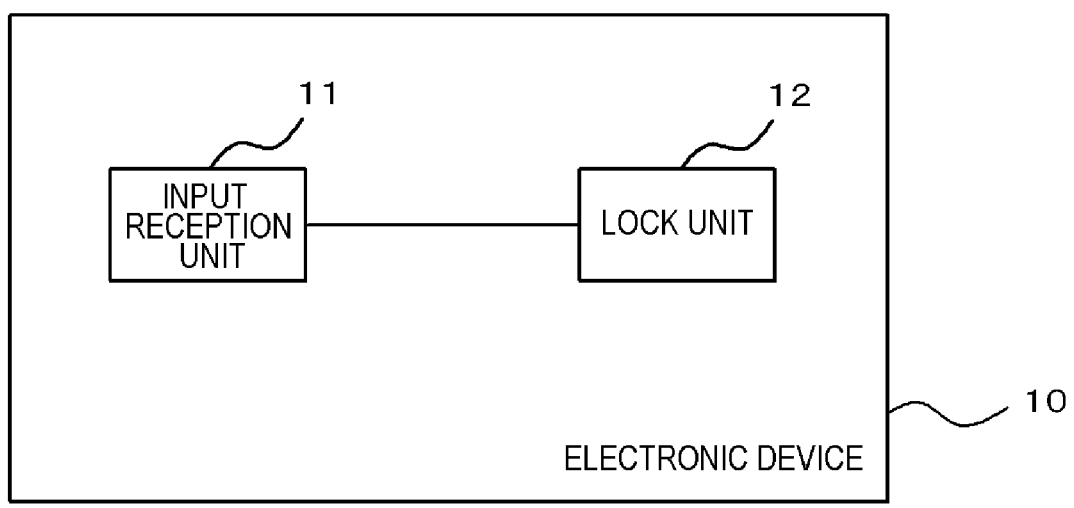
FIG. 1 is a diagram illustrating an example of a functional block diagram of an electronic device of an exemplary embodiment.

FIG. 1 illustrates an example of a functional block diagram of an electronic device of this exemplary embodiment. The electronic device 10 of this exemplary embodiment includes an input reception unit 11, and a lock unit 12, as illustrated in FIG. 1.

The input reception unit 11 receives an input from a user (user input) through an operation to indicate a predetermined region (hereinafter, "region indication operation") using a predetermined object. For example, the input reception unit 11 receives the user input through a region indication operation to indicate a predetermined region that is unidentifiable from other regions using the predetermined object, or a predetermined region that is identifiable from the other regions by a temporary image or light.

Specifically, the input reception unit 11 may receive the user input caused by a touch operation (tap, touch-and-hold, touch-and-slide, or flick) with respect to a touch region provided by a touch panel display, a touch pad, or the like performed with a predetermined object (for example, a finger or a touch pen). In the case of the touch operation, the input reception unit 11 is able to specify a region in the touch region indicated by the user by specifying a position in the touch region touched with the predetermined object.

Further, in addition to or in place of the touch operation, the input reception unit 11 may receive a user input caused by a non-contact operation performed in a state in which the electronic device 10 and the predetermined object are not in contact. Details of non-contact operation are not particularly limited and any related art may be used. For example, the input reception unit 11 may specify a region indicated by the user by specifying a position of the predetermined object located in a space using a camera, a temperature sensor, or the like. Or, the input reception unit 11 may receive, using a plurality of reception units (for example, microphones), reflection waves obtained when supersonic waves emitted by the input reception unit 11 are reflected by the predetermined object, and specify a relative position relationship between the plurality of reception units and the predetermined object (for example, the predetermined object is closer to a second reception unit relative to a first reception unit) using a deviation of a reception timing of the reflection waves in the plurality of reception units. Also, the input reception unit 11 may specify the region indicated by the user using the specified relative position relationship between the plurality of reception units and the predetermined object. In the case of such an operation, the input reception unit 11 is able to receive a predetermined input based on a position, a movement trajectory, or the like of the predetermined object.

The input reception unit 11 inputs information indicating content of the received user input to the lock unit 12.

The lock unit 12 locks a predetermined function, and unlocks the lock when the input reception unit 11 receives an input caused by a first operation (a first region indication operation) and an input caused by a second operation (a second region indication operation) in parallel. That is, the lock means unlocks the lock when the lock means receives the input caused by the first operation and the input caused by the second operation in parallel in time series.

Locking is disabling execution of a predetermined function. A lock may be a lock for prevention of a so-called erroneous operation or may be a lock for ensuring security. A function that is a locking target is not particularly limited. For example, the function may be a function of receiving a user input from a standby screen on which a plurality of icons are displayed or may be a function (service) provided by a predetermined application (for example, a mail application). These are only illustrations and the present invention is not limited to thereto.

Further, a border between a predetermined region to be indicated by the first operation and other regions may not be visible.

For example, when the first operation is a touch operation with respect to the touch panel display, an image (for example, an icon) showing a region to be touched (indicated) by the first operation may not be displayed in an image displayed on the touch panel display. With such a configuration, the operator is also able to perform the first operation if the operator recognizes a predetermined region to be indicated by the first operation in advance. For example, when the predetermined region to be indicated by the first operation is a region that is relatively large and relatively easily recognized based on the touch panel display, such as an entire region, an upper half region, a lower half region, a right half region, a left half region, or the like in the touch panel display, it is possible to simplify the first operation of the operator.

In another example, when the first operation is a touch operation with respect to the touch pad, information showing the region to be touched (indicated) by the first operation may not be displayed on the touch pad. Since a general touch pad is not configured to be able to display information in the touch region, the above condition is met by the touch pad. Further, when the first operation is the non-contact operation, information (for example, light) showing the region to be indicated by the first operation may not be displayed over a space. With such a configuration, the operator is also able to perform the first operation as described above. Further, when the region to be indicated by the first operation is a region that is relatively easily recognized based on a physical apparatus (for example, a touch pad or a sensor), it is possible to simplify the first operation performed by the operator.

Hereinafter, an operation and effects of this exemplary embodiment will be described.

For a third party, it is more difficult to recognize an operation content from an operation for indicating a predetermined region than from an operation (for example, pressing) with respect to a physically standing operation target (for example, a button).

In the case of the operation with respect to the physically standing operation target, since a target of an operation performed by the operator (an operation target) is quite obvious, a third party who has seen the operator performing the operation can easily recognize the operation target that the operator is operating. Further, since the operated operation target is visibly present even after the operation performed by the operator ends, the third party can recall the operation content by viewing the operation target again or fix the operation content in memory by repeatedly reciting the content of the operation while viewing the operation target.

On the other hand, in an operation to indicate the predetermined region, the predetermined region to be indicated is unidentifiable from other regions or is unidentifiable using a temporary image or light.

When the indicated predetermined region is unidentifiable from the other regions, the third party is unable to easily recognize the region indicated by the operator even when the third party sees the operator performing the operation. Further, the third party is likely not to notice that the operator is performing a region indication operation to indicate a predetermined region. Therefore, the third party is unable to easily recognize operation content.

Further, even when the indicated predetermined region is identifiable by a temporary image or light, it is difficult for the region being a target of the operation performed by the operator to be recognized by the third party in comparison with the physically standing operation target. That is, the third party is unable to easily determine whether the image or the light is an operation target or a simple illumination or the like. Further, since the predetermined region becomes unidentifiable from other regions after the operation performed by the operator ends, the third party is unable to fix the operation content in memory by recalling the operation content by seeing the predetermined region again, or repeatedly reciting the operation content while seeing the predetermined region.

According to this embodiment in which the lock is unlocked when the input caused by the first operation, which is a region indication operation, and the input caused by the second operation are received in parallel, it is further difficult for the content of the operation to be recognized by the third party.

Further, a border between the predetermined region to be indicated by the first operation and other regions may not be visible, as described above.

With such a configuration, even when the third party sees the operator performing the unlocking operation, the third party is unable to easily recognize a region indicated through the first operation by the operator. Further, the third party may be unlikely to notice the first operation itself that the operator is performing. Further, since the first operation and the second operation are performed in parallel, the third party easily pays attention to the second operation, and it is difficult for the presence of the first operation to be noticed and for the region indicated by the first operation to be identified.

According to this exemplary embodiment described above, it is possible to prevent the content of the unlocking operation from being easily recognized by another person even when the unlocking operation is seen by the other person.

Second Exemplary Embodiment

An example of a functional block diagram of an electronic device of this exemplary embodiment is illustrated in FIG. 1, similarly to the first exemplary embodiment. The electronic device 10 of this exemplary embodiment includes an input reception unit 11 and a lock unit 12, as illustrated in FIG. 1.

The input reception unit 11 receives an input from the user through a first input device and a second input device provided in positions which are not simultaneously visible. The first input device and the second input device are provided in the electronic device 10.

A type of the first input device and the second input device is not particularly limited and any conventional input device may be used. For example, the device may be a touch panel display, may be a touch pad, may be a touch sensor, may be a temperature sensor, or may be a button. Further, the type of the first input device and the second input device may be the same or may be different.

The lock unit 12 locks a predetermined function, and unlocks the lock when the input reception unit 11 receives an input caused by a first operation through the first input device and an input caused by a second operation through the second input device in parallel. Since the lock and the predetermined locking function are as described in the first exemplary embodiment, description will not be repeated here.

Hereafter, an operation and effects of this exemplary embodiment will be described.

In the electronic device of this exemplary embodiment, the first input device and the second input device are provided in positions which are not simultaneously visible. Therefore, even when an unlocking operation, that is, an operation to perform an input caused by a first operation through the first input device and an input caused by a second operation through the second input device in parallel is seen by a third party, operation content of both of the first operation and the second operation is not recognized. Further, that two such operations are being performed in parallel is hardly noticed.

Therefore, according to this exemplary embodiment, even when the unlocking operation is seen by another person, it is possible to prevent the content of unlocking operations including the first operation and the second operation from being easily recognized by the person.

Third Exemplary Embodiment

This exemplary embodiment is based on the first or second exemplary embodiment and is different in that the first operation and the second operation are limited to operations to be described below. Since other configurations are the same as those in the first or second exemplary embodiment, description thereof will not be repeated here.

In this exemplary embodiment, the first operation is a static operation, and the second operation is a dynamic operation. In the static operation, an operation of an object (for example, a finger or a pointer) used to operate an operation target is smaller than that in the dynamic operation. The small operation means, for example, that an amount of a movement is small and/or that a movement speed is low. For example, the static operation may be a touch-and-hold operation with respect to a touch region, may be an operation to continue to press a predetermined button, may be an operation to continue to touch a touch sensor, or may be an operation to continue to indicate a predetermined region. In all of such operations, the operation target is operated (for example, touched or pressed) with a predetermined object (for example, a finger or a pointer), and then, a state of the predetermined operation is maintained without the object being moved.

In the case of such an exemplary embodiment, the third party who has seen the operator performing the unlocking operation is likely to pay attention to the second operation (dynamic operation). That is, the third party easily overlooks the first operation. Further, if the configuration that "the border between a predetermined region to be indicated by the first operation and other regions is invisible" described in the first exemplary embodiment is adopted, effects increase.

In the case of such an exemplary embodiment, while the content of the second operation may be recognized by the third party, the third party is likely to overlook the presence of the first operation, and thus, it is possible to prevent content of the first operation from being recognized.

According to this exemplary embodiment described above, even when the unlocking operation is seen by another person, it is possible to prevent the content of unlocking operations including the first operation and the second operation from being easily recognized by the other person.

Fourth Exemplary Embodiment

This exemplary embodiment is based on the third exemplary embodiment and is different in that the first operation and the second operation are further limited. Since other configurations are the same as those in the third exemplary embodiment, description thereof will not be repeated here.

The input reception unit 11 of this exemplary embodiment receives the input caused by the first operation (static operation) and the input caused by the second operation (dynamic operation), which are performed by the region indication operation described in the first exemplary embodiment.

The first operation is an operation to indicate a predetermined region and then maintain a predetermined object without moving an indication position. For example, when the first operation is a touch operation with respect to the touch region, a so-called touch-and-hold operation corresponds to such an operation.

The second operation is a predetermined dynamic operation that is performed in a state in which the indication position is maintained in the first operation.

Hereinafter, specific examples of the first operation and the second operation will be described using FIGS. 2(A)-(D) to 6(A)-(D). Further, here, a case in which the first operation and the second operation are touch operations with respect to the touch region is used as an example.

Figure 2:
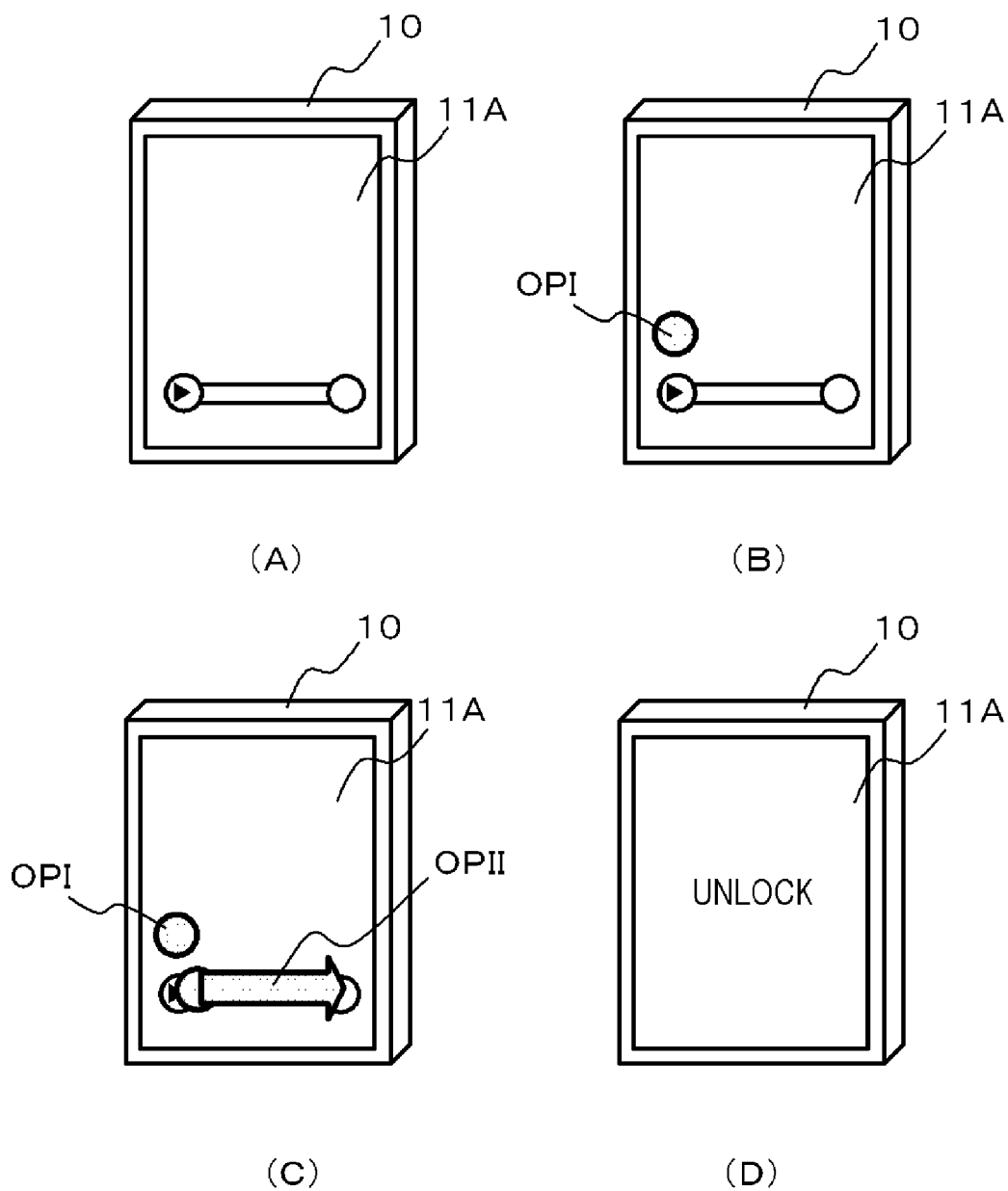
FIGS. 2(A)-(D) are diagrams illustrating an unlocking operation in this exemplary embodiment.

FIG. 2(A) schematically illustrates a perspective view of an electronic device 10 with a touch panel display 11A. The electronic device 10 is a portable terminal that can be held with one hand. A lock screen indicating a lock state is displayed on the touch panel display 11A. An image (image inducing a slide operation) that is a second operation target is displayed on the illustrated lock screen, but an image that is a first operation target is not displayed.

When the lock is to be unlocked, an operator first touches a predetermined region on the touch panel display 11A in a first operation as illustrated in FIG. 2(B), and holds the touch as it is (illustrated OPI). Also, the predetermined region may be an entire region on the touch panel display 11A in which the image that is a second operation target is not displayed, may be a left half region or a right half region of the touch panel display 11A, or may be an upper half region or a lower half region of the touch panel display 11A.

For example, the operator can perform a first operation OPI with a finger of one hand (the left hand or the right hand) holding the electronic device 10 while holding the electronic device 10 with the hand. A state in which the operator performs the first operation OPI with the thumb of the left hand while holding the electronic device 10 with the left hand is illustrated in FIG. 2(B).

Then, the operator performs a second operation OPII while maintaining the state in which the operator is performing the first operation OPI as illustrated in FIG. 2(C). That is, the operator performs a slide operation with respect to an image (an image inducing the slide operation) that is a second operation target displayed on the lock screen in the second operation.

For example, the operator can hold the electronic device 10 with one hand (left hand or right hand), and perform the second operation OPII (slide operation) with a predetermined object (for example, the finger of the other hand) while performing the first operation OPI with a finger of the hand. FIG. 2(C) illustrates a state in which the operator is performing the second operation OPII (slide operation) with a predetermined object (for example, a finger of the right hand) while holding the electronic device 10 with the left hand and performing the first operation OPI with the thumb of the left hand.

Then, the lock is unlocked, as illustrated in FIG. 2(D).

In the example, the operation and effects described in the first and third exemplary embodiments are realized. Further, since the first operation OPI can be performed with the hand holding the electronic device 10, it is possible to make it further difficult for the presence of the first operation OPI to be noticed by the third party.

Figure 3:
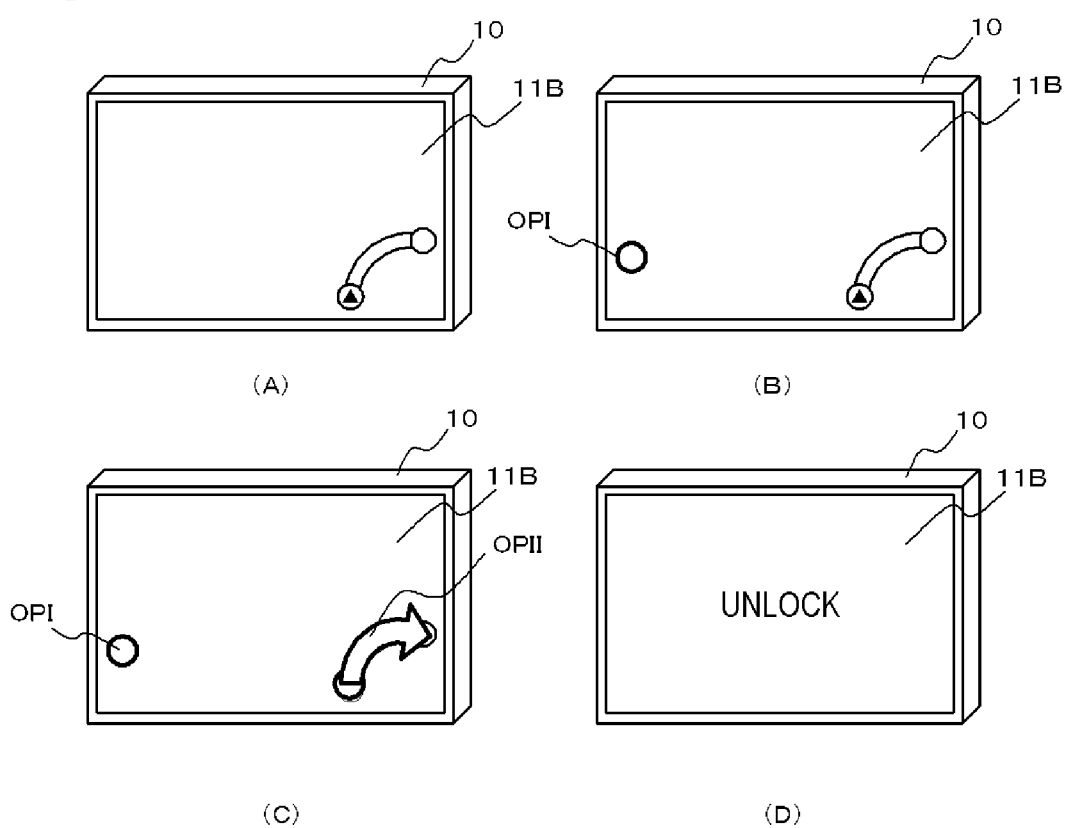
FIGS. 3(A)-(D) are diagrams illustrating an unlocking operation in this exemplary embodiment.

FIG. 3(A) schematically illustrates a perspective view of an electronic device 10 with a touch panel display 11B. The electronic device 10 is a large terminal to stably perform a touch operation with one hand while holding the terminal with the hand, and, for example, a so-called smart pad or the like corresponds to the electronic device 10. In the touch panel display 11B, a lock screen indicating a lock state is displayed. An image (image inducing a slide operation) that is a second operation target is displayed on the illustrated lock screen, but an image that is a first operation target is not displayed.

When the lock is to be unlocked, in the first operation, the operator touches a predetermined region on the touch panel display 11B as illustrated in FIG. 3(B), and holds the touch (illustrated OPI). The predetermined region may be an entire region on the touch panel display 11B in which the image that is a second operation target is not displayed, may be a left half region or a right half region of the touch panel display 11B, or may be an upper half region or a lower half region of the touch panel display 11B.

For example, the operator can perform a first operation OPI with a finger of one hand while holding a left edge and a right edge of the electronic device 10 with both hands. A state in which the operator performs the first operation OPI with the thumb of the left hand is illustrated in FIG. 3(B).

Then, the operator performs a second operation OPII while maintaining the state in which the operator is performing the first operation OPI, as illustrated in FIG. 3(C). That is, the operator performs a slide operation with respect to an image (an image inducing the slide operation) that is a second operation target displayed on the lock screen in the second operation.

For example, the operator can hold the left edge and the right edge of the electronic device 10 with both hands, and perform the first operation OPI with a finger of one hand while performing the second operation OPII (slide operation) with a finger of the other hand. FIG. 3(C) illustrates a state in which the operator is performing the second operation OPII (slide operation) with a finger of the right hand while performing the first operation OPI with the thumb of the left hand.

Then, the lock is unlocked, as illustrated in FIG. 3(D).

In the example, the operation and effects described in the first and third exemplary embodiments are realized. Further, since the first operation OPI can be performed with the hand holding the electronic device 10, it is possible to make it further difficult for the presence of the first operation OPI to be noticed by the third party.

Further, in the example illustrated in FIGS. 3(A)-(D), an unlocking operation can be performed in a state in which the electronic device 10 is placed, for example, on a desk or the lap. In such a case, the first operation can be performed with one hand while holding (for example, pressing) the electronic device with that hand not to be moved. Also, the second operation can be performed with a predetermined object (for example, a finger of the other hand).

FIG. 4(A) schematically illustrates a perspective view of an electronic device 10 with a touch panel display 11A. The electronic device 10 is a portable terminal that can be held with one hand. A lock screen indicating a lock state is displayed on the touch panel display 11A. An image (an image of a plurality of objects (indicated as circles in FIG. 4(A)) arranged according to a predetermined rule) that is a second operation target is displayed on the illustrated lock screen, but an image that is a first operation target is not displayed.

When the lock is to be unlocked, an operator first touches a predetermined region on the touch panel display 11A in a first operation as illustrated in FIG. 4(B), and holds the touch as it is (illustrated OPI). Since the first operation is the same as that in the example described using FIGS. 2(A)-(D), description thereof will not be repeated here. A state in which the operator performs the first operation OPI with the thumb of the left hand while holding the electronic device 10 with the left hand is illustrated in FIG. 4(B).

Then, the operator performs a second operation OPII while maintaining a state in which the operator is performing the first operation OPI, as illustrated in FIG. 4(C). That is, in the second operation, a slide operation is performed to touch the image (the plurality of objects) that is a second operation target displayed on the lock screen in a predetermined order.

The operator can perform the second operation in the same way as in the example described using FIGS. 2(A)-(D). FIG. 4(C) illustrates a state in which the operator is performing the second operation OPII (slide operation) with a predetermined object (for example, a finger of the right hand) while holding the electronic device 10 with the left hand and performing the first operation OPI with the thumb of the left hand.

Then, the lock is unlocked, as illustrated in FIG. 4(D). Further, when the order of touching the plurality of objects in the slide operation in FIG. 4(C) is different from the predetermined order, the lock is not unlocked.

In the example, the operation and effects described in the first and third exemplary embodiment are realized. Further, since the first operation OPI can be performed with the hand holding the electronic device 10, it is possible to make it further difficult for the presence of the first operation OPI to be noticed by the third party.

Further, the example is also applicable to the large electronic device 10 so as to stably perform the touch operation with one hand while holding the electronic device 10 with that hand, described using FIGS. 3(A)-(D).

Figure 5:
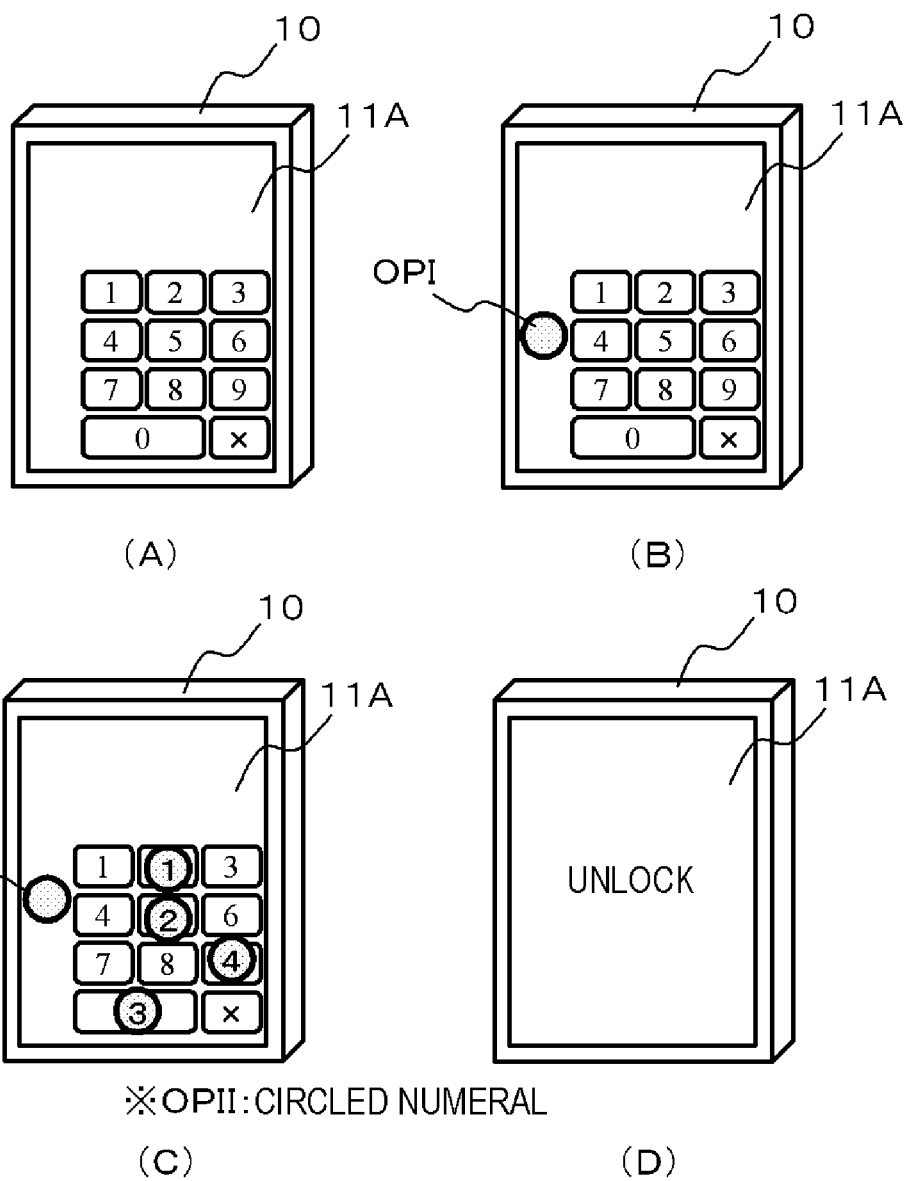
FIGS. 5(A)-(D) are diagrams illustrating an unlocking operation in this exemplary embodiment.

FIG. 5(A) schematically illustrates a perspective view of an electronic device 10 with a touch panel display 11A. The electronic device 10 is a portable terminal that can be held with one hand. A lock screen indicating a lock state is displayed on the touch panel display 11A. An image (an image of a plurality of objects with predetermined information (a numeral or a sign in FIG. 5A)) that is a second operation target is displayed on the illustrated lock screen, but an image that is a first operation target is not displayed.

When the lock is to be unlocked, an operator first touches a predetermined region on the touch panel display 11A in a first operation as illustrated in FIG. 5(B), and holds the touch as it is (illustrated OPI). Since the first operation is the same as that in the example described using FIGS. 2(A)-(D), description thereof will not be repeated here. A state in which the operator performs the first operation OPI with the thumb of the left hand while holding the electronic device 10 with the left hand is illustrated in FIG. 5(B).

Then, the operator performs a second operation OPII while maintaining a state in which the operator is performing the first operation OPI, as illustrated in FIG. 5(C). That is, in the second operation, an operation is performed to touch the image (the plurality of objects with predetermined information (a numeral or a sign in FIG. 5A)) that is a second operation target displayed on the lock screen in a predetermined order. This corresponds to a password input operation or the like.

The operator can perform the second operation in the same way as in the example described using FIGS. 2(A)-(D). FIG. 5(C) illustrates a state in which the operator is performing the second operation OPII (password input operation) with a predetermined object (for example, a finger of the right hand) while holding the electronic device 10 with the left hand and performing the first operation OPI with the thumb of the left hand.

Then, the lock is unlocked, as illustrated in FIG. 5(D). Further, when the password input in FIG. 5(C) is different from a predetermined password, the lock is not unlocked.

In the example, the operation and effects described in the first and third exemplary embodiments are realized. Further, since the first operation OPI can be performed with the hand holding the electronic device 10, it is possible to make it further difficult for the presence of the first operation OPI to be noticed by the third party.

Further, the example is also applicable to the large electronic device 10 so as to stably perform the touch operation with one hand while holding the electronic device 10 with that hand, described using FIGS. 3(A)-(D).

Figure 6:
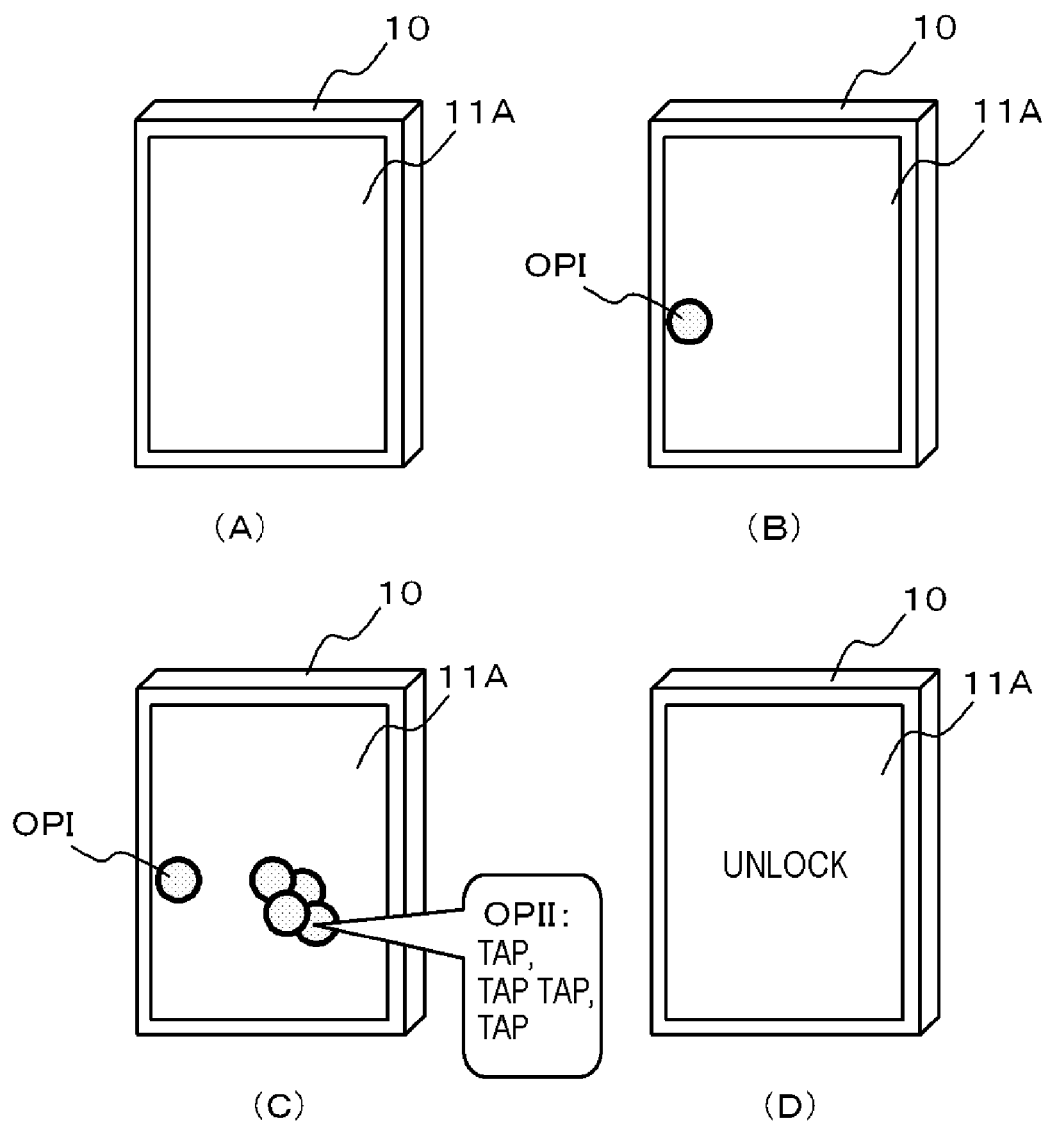
FIGS. 6(A)-(D) are diagrams illustrating an unlocking operation in this exemplary embodiment.

FIG. 6(A) schematically illustrates a perspective view of the electronic device 10 with a touch panel display 11A. The electronic device 10 is a portable terminal that can be held with one hand. A lock screen showing indicating a lock state is displayed on the touch panel display 11A. Neither an image that is a first operation target nor an image that is a second operation target is displayed on the illustrated lock screen.

When the lock is to be unlocked, an operator first touches a predetermined region on the touch panel display 11A in a first operation as illustrated in FIG. 6(B), and holds the touch as it is (illustrated OPI). Since the first operation is the same as that in the example described using FIGS. 2(A)-(D), description thereof will not be repeated here. A state in which the operator performs the first operation OPI with the thumb of the left hand while holding the electronic device 10 with the left hand is illustrated in FIG. 6(B).

Then, the operator performs a second operation OPII while maintaining a state in which the operator is performing the first operation OPI, as illustrated in FIG. 6(C).

The operator can perform the second operation in the same way as in the example described using FIGS. 2(A)-(D). FIG. 6(C) illustrates a state in which the operator is performing the second operation OPII (a predetermined number of touch input operations at a predetermined rhythm) with a predetermined object (for example, a finger of the right hand) while holding the electronic device 10 with the left hand and performing the first operation OPI with the thumb of the left hand.

Then, the lock is unlocked, as illustrated in FIG. 6(D). Further, if at least one of the rhythm and the number of times of the touch input in FIG. 6(C) is different from the predetermined rhythm or a predetermined number of times, the lock is not unlocked.

In the example, the operation and effects described in the first and third exemplary embodiments are realized. Further, since the first operation OPI can be performed with the hand holding the electronic device 10, it is possible to make it further difficult for the presence of the first operation OPI to be noticed by the third party.

Further, the example is also applicable to the large electronic device 10 so as to stably perform the touch operation with one hand while holding the electronic device 10 with the one hand described using FIGS. 3(A)-(D).

While the specific examples of the first operation and the second operation have been described above, the second operation is not limited to the operation illustrated here, and even when the second operation is a different operation, the same operation and effects can be realized.

Further, while the case in which the first operation and the second operation are touch operations with respect to the touch region has been described by way of example here, the same operation and effects can be realized even when the first operation and the second operation are other region indication operations. For example, the first operation may be a non-contact operation and the second operation may be the touch operation, or vice versa.

According to this exemplary embodiment described above, even when the unlocking operation is seen by another person, it is possible to prevent the content of unlocking operations including the first operation and the second operation from being easily recognized by the other person.

Fifth Exemplary Embodiment

This exemplary embodiment is based on the fourth exemplary embodiment, and is different in a configuration of the lock unit 12. Since other configurations are the same as those in the fourth exemplary embodiment, description thereof will not be repeated here.

When the input reception unit 11 receives the input caused by the first operation to maintain an indication of a first predetermined region, the lock unit 12 unlocks a lock if first information is input by the second operation. Further, when the input reception unit 11 receives the input caused by the first operation to maintain the indication of the first predetermined region, the lock unit 12 does not unlock the lock if information different from the first information is input by the second operation.

Further, when the input reception unit 11 receives the input caused by the first operation to maintain the indication of a second predetermined region different from the first predetermined region, the lock unit 12 unlocks the lock if second information different from the first information is input by the second operation. Further, when the input reception unit 11 receives the input caused by the first operation to maintain the indication of the second predetermined region, the lock unit 12 does not unlock the lock if information different from the second information is input by the second operation.

That is, in this exemplary embodiment, there are a plurality of combinations of input content of the first operation and input content of the second operation for unlocking the lock. The lock unit 12 holds a plurality of combinations of the input content caused by the first operation and the input content caused by the second operation, and unlocks the lock if the input reception unit 11 receives the input of any one of the combinations.

In any one of the combinations, the first operation is the operation to maintain an indication of a predetermined region, but the predetermined regions to be indicated are different from each other, and thus, the input content is different. The operation content of the second operation is not particularly limited, but information input by the second operation included in a first combination is different from information input by the second operation included in a second combination.

Hereinafter, specific examples of the first operation and the second operation will be described using FIGS. 4(A)-(D) to 9(A)-(D). Further, here, a case in which the first operation and the second operation are touch operations with respect to the touch region is used as an example.

In the example illustrated in FIGS. 4(A)-(D), when the input reception unit 11 receives the input caused by the slide operation (the second operation OPII) to touch an image (a plurality of objects) that is a second operation target in a predetermined order displayed on the lock screen with the predetermined object (for example, the finger of the right hand) while performing the operation (the first operation OPI) to maintain the touch of the predetermined region (the first region) on the touch panel display 11A as described in the fourth exemplary embodiment, the lock unit 12 unlocks the lock. In this case, when the touch order of the image (the plurality of objects) that is a second operation target in the second operation OPII is different from the illustrated order, the lock is not unlocked.

Figure 7:
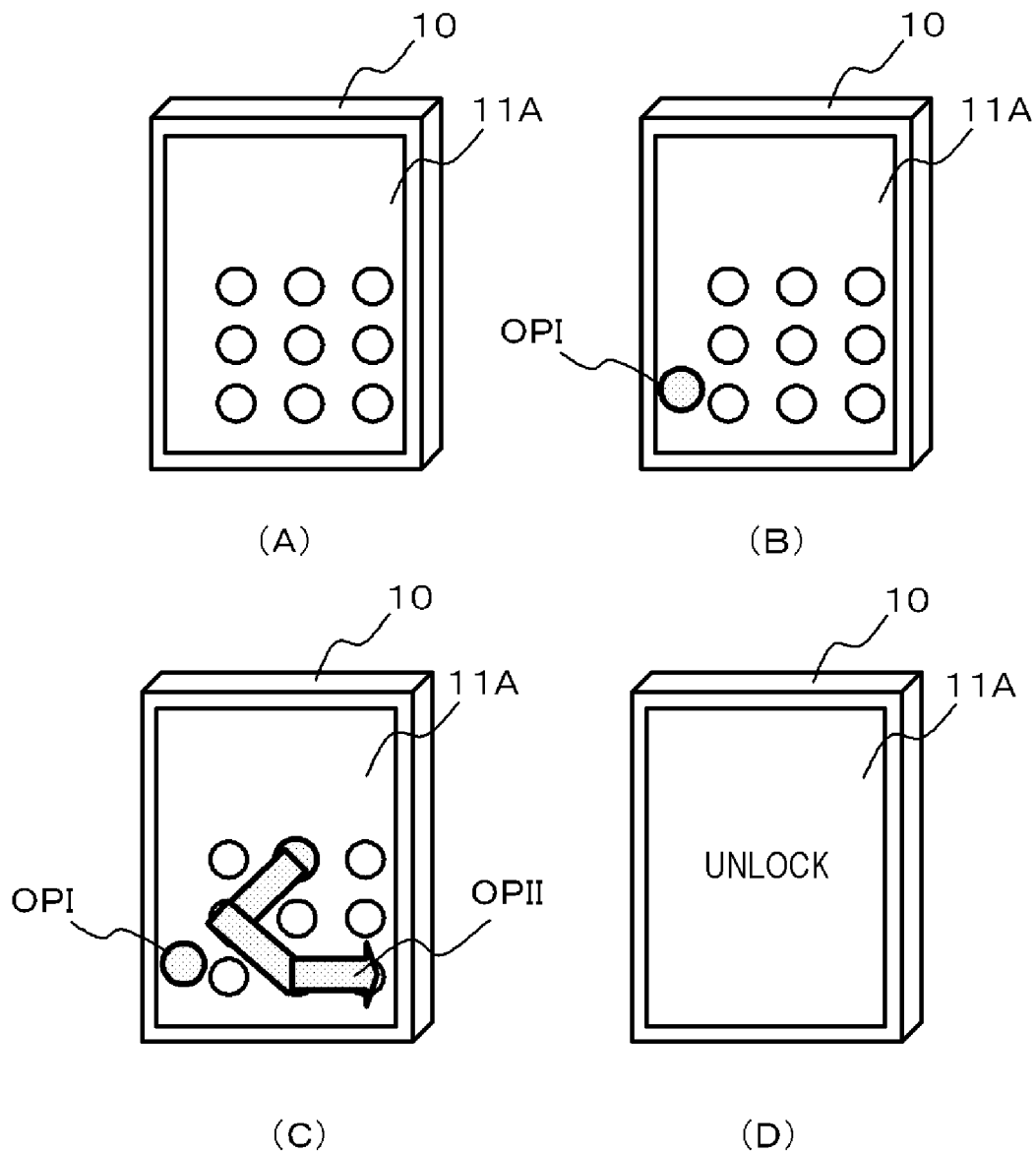
FIGS. 7(A)-(D) are diagrams illustrating an unlocking operation in this exemplary embodiment.

Next, an electronic device 10 and a lock screen similar to those in the example illustrated in FIGS. 4(A)-(D) are displayed in FIG. 7(A). Also, in the example, a region different from that in the example illustrated in FIG. 4(B) is touched in a first operation OPI, as illustrated in FIG. 7(B). In the example illustrated in FIG. 4(B), the vicinity of a height (a first region) between a top stage and a middle stage in an image (a plurality of objects) that is a second operation target is touched, whereas in the example illustrated in FIG. 7(B), the vicinity of a height (a second region) between a middle stage and a bottom stage in an image (a plurality of objects) that is a second operation target is touched.

In the example of FIG. 7(B) in which the touch of the second region is maintained by the first operation OPI, when the input reception unit 11 receives an input caused by a slide operation (second operation OPII) to touch the image (the plurality of objects) that is the second operation target displayed on the lock screen in a predetermined order different from the order when the touch of the first region is maintained (FIG. 4(C)) with a predetermined object (for example, a finger of the right hand) as illustrated in FIG. 7(C), the lock unit 12 unlocks the lock. In this case, when the touch order of the image (the plurality of objects) that is a second operation target in the second operation OPII is different from the illustrated order, the lock is not unlocked.

Then, in the example illustrated in FIGS. 5(A)-(D), when the input reception unit 11 receives an operation (the second operation OPII) to input a predetermined password (a first password) using the image (the plurality of objects with predetermined information (a numeral or a sign in FIGS. 5(A)-(D))) displayed on the lock screen with the predetermined object (for example, the finger of the right hand) while performing the operation (the first operation OPI) to maintain the touch of the predetermined region (the first region) on the touch panel display 11A as described in the fourth exemplary embodiment, the lock unit 12 unlocks the lock. In this case, when the password input in the second operation OPII is different from the first password, the lock is not unlocked.

Figure 8:
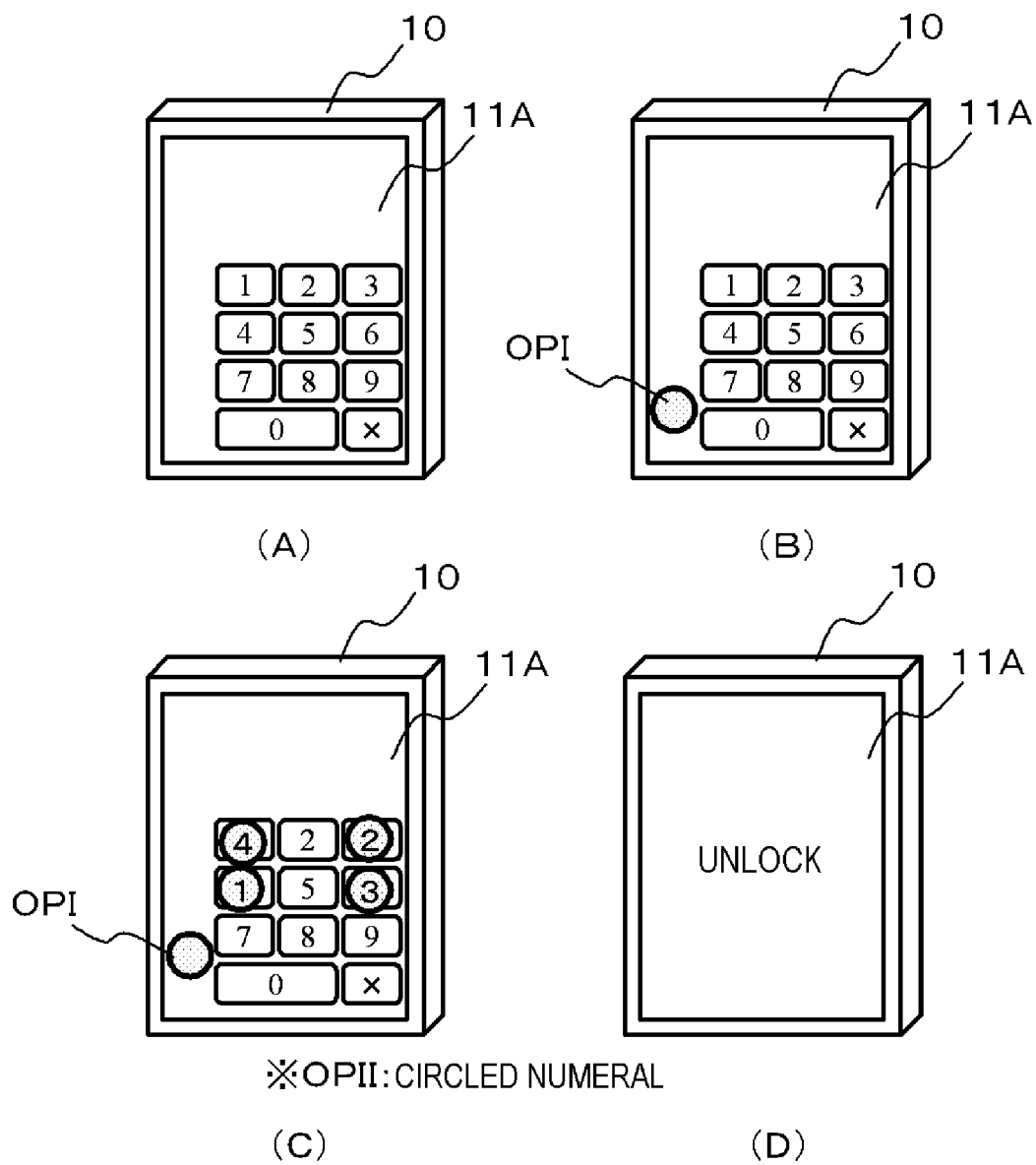
FIGS. 8(A)-(D) are diagrams illustrating an unlocking operation in this exemplary embodiment.

Next, in FIG. 8(A), an electronic device 10 and a lock screen similar to those in the example illustrated in FIGS. 5(A)-(D) are displayed. Also, in the example, a region different from the region in the example illustrated in FIG. 5(B) is touched in a first operation OPI, as illustrated in FIG. 8(B). In the example illustrated in FIG. 5(B), the vicinity of the height (the first region) between the top stage and the second stage from the top in the image (a plurality of objects) that is a second operation target is touched, whereas in the example illustrated in FIG. 8(B), the vicinity of the height (a second region) between a bottom stage and a second stage from the bottom in an image (a plurality of objects) that is a second operation target is touched.

In the example of FIG. 8(B) in which the touch of the second region is maintained by the first operation OPI, when the input reception unit 11 receives an operation (a second operation OPII) to input a second predetermined password different from the first password with a predetermined object (for example, a finger of the right hand) as illustrated in FIG. 8(C), the lock unit 12 unlocks the lock. In this case, when the password input in the second operation OPII is different from a second password, the lock is not unlocked.

Then, in the example illustrated in FIGS. 6(A)-(D), when the input reception unit 11 receives an operation to touch the touch panel display 11A a predetermined number of times at a predetermined rhythm with the predetermined object (for example, the finger of the right hand) while performing the operation (the first operation OPI) to maintain the touch of the predetermined region (the first region) on the touch panel display 11A as described in the fourth exemplary embodiment, the lock unit 12 unlocks the lock. In this case, when the content (the rhythm and the number of times of touches) input in the second operation OPII is different from the predetermined content (first content), the lock is not unlocked.

Figure 9:
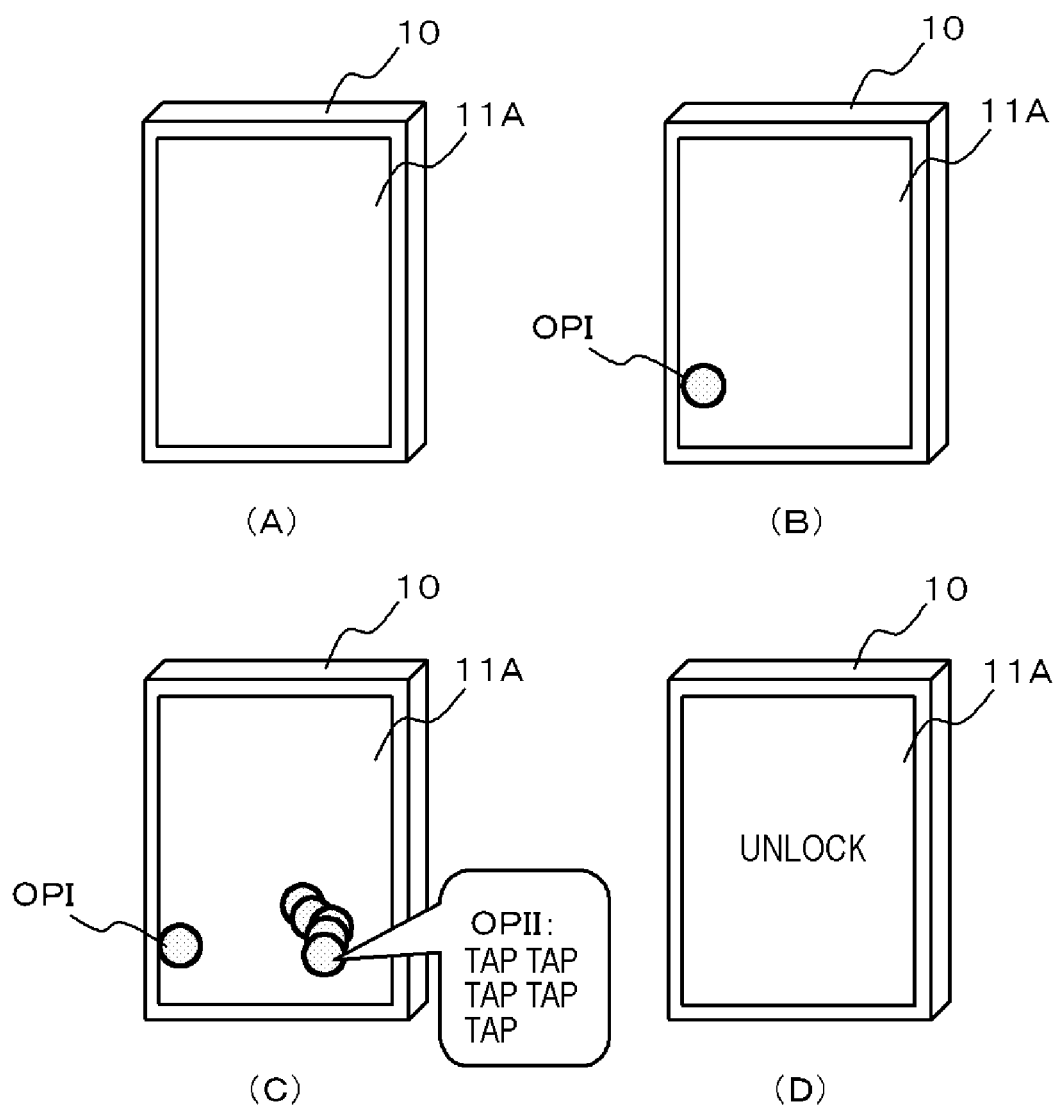
FIGS. 9(A)-(D) are diagrams illustrating an unlocking operation in this exemplary embodiment.

Next, in FIG. 9(A), an electronic device 10 and a lock screen similar to those in the example illustrated in FIGS. 6(A)-(D) are displayed. Also, in the example, a region different from the region in the example illustrated in FIG. 6(B) is touched in a first operation OPI, as illustrated in FIG. 9(B). In the example illustrated in FIG. 6(B), the vicinity of the middle (the first region) in a height direction (a longitudinal direction in FIG. 6(B)) of the touch panel display 11A is touched, whereas in the example illustrated in FIG. 9(B), a lower portion (a second region) than the vicinity of a middle in a height direction (a longitudinal direction in FIG. 9(B)) of the touch panel display 11A is touched.

In the example of FIG. 9(B) in which the touch of the second region is maintained by the first operation OPI, when the input reception unit 11 receives an operation (second operation OPII) to touch the touch panel display 11A a predetermined number of times at a predetermined rhythm, which is different from the first content, with a predetermined object (for example, a finger of the right hand) as illustrated in FIG. 9(C), the lock unit 12 unlocks the lock. In this case, when the content input in the second operation OPII is different from the predetermined content, the lock is not unlocked.

While the specific examples of the first operation and the second operation have been described above, the second operation is not limited to the operation illustrated here, and even when the second operation is a different operation, the same operation and effects can be realized. Further, the touch position in the first operation OPI is not limited to the illustrated position.

Further, while the case in which the first operation and the second operation OPII are touch operations with respect to the touch region has been described by way of example here, the same operation and effects can be realized even when the first operation and the second operation are other region indication operations. For example, the first operation may be a non-contact operation and the second operation may be the touch operation, or vice versa.

Further, the exemplary embodiment is also applicable to the large electronic device 10 so as to stably perform the touch operation with one hand while holding the electronic device 10 with that hand, described using FIGS. 3(A)-(D).

According to this exemplary embodiment, when the input content according to the indication region in the first operation is received by the second operation, the lock is unlocked. It is difficult for the first operation to be noticed by a third party, as described in the above-described exemplary embodiment. Therefore, as a matter of course, it is difficult for a change in the region indicated by the first operation to be noticed by the third party.

In such an exemplary embodiment, when the lock is unlocked through a combination of input content of the first operation and input content of the second operation that is different every time, the third party who does not notice the first operation is confused and unable to recognize the content of the unlocking operation.

According to this exemplary embodiment described above, even when the unlocking operation is seen by another person, it is possible to prevent the content of unlocking operations including the first operation and the second operation from being easily recognized by the other person.

Sixth Exemplary Embodiment

This exemplary embodiment is based on the fifth exemplary embodiment, and is different in the following points of a configuration.

That is, in the fifth exemplary embodiment, when the input content according to the indication region in the first operation is received by the second operation, the lock is unlocked. On the other hand, in this exemplary embodiment, when input content according to a type of an object indicating a predetermined region in the first operation is received by the second operation, the lock is unlocked. Since other configurations are the same as those in the fifth exemplary embodiment, description thereof will not be repeated here.

When the input reception unit 11 receives the input caused by the first operation to maintain an indication of a predetermined region using a first object, the lock unit 12 of this exemplary embodiment unlocks a lock when first information is input by the second operation. Further, when the input reception unit 11 receives the input caused by the first operation to maintain the indication of the predetermined region using the first object, the lock unit 12 does not unlock the lock if information different from the first information is input by the second operation.

Further, when the input reception unit 11 receives the input caused by the first operation to maintain an indication of a predetermined region using a second object different from the first object, the lock unit 12 unlocks the lock if second information different from the first information is input by the second operation. Further, when the input reception unit 11 receives the input caused by the first operation to maintain the indication of a predetermined region using the second object, the lock unit 12 does not unlock the lock if information different from the second information is input by the second operation.

The region indicated using the first object may be the same as or may be different from the region indicated using the second object.

That is, in this exemplary embodiment, there are a plurality of combinations of input content of the first operation and input content of the second operation for unlocking the lock. The lock unit 12 holds a plurality of combinations of the input content (including the type of the object) of the first operation and the input content of the second operation, and unlocks the lock when the input reception unit 11 receives an input of any one of the combinations.

For example, when the input reception unit 11 receives the first operation through the touch operation with respect to the touch region, the input reception unit 11 may also acquire predetermined information and identify a finger (thumb, index finger, middle finger, ring finger, or little finger) used for touching based on the information. Also, the input reception unit 11 may input information indicating the identified finger to the lock unit 12.

Means used for the input reception unit 11 to identify a type of the finger that is touching is not particularly limited and any related art may be used. For example, the input reception unit 11 may acquire fingerprint information of the finger that is touching and specify the type of the finger that is touching using fingerprint information of the operator stored in advance. Or, the input reception unit 11 may use information indicating a shape, a size, or the like of the touched region, and specify the type of the finger that is touching using a feature amount of the information (the shape, the size, or the like of the touched region) of each finger stored in advance.

Further, even when the input reception unit 11 receives the region indication operation based on the non-contact operation, the input reception unit 11 may similarly acquire predetermined information and identify an object used for indication based on the information. Also, information indicating the identified object may be input to the lock unit 12.

In the example, means used for the input reception unit 11 to identify a type of touching object is not particularly limited and any related art may be used. For example, the input reception unit 12 may hold a feature amount (for example, a shape, a size, or a color) of a plurality of objects in advance, and specify the type of object using the feature amount and a feature amount acquired from an object indicating a predetermined region in the first operation.

According to this exemplary embodiment, it is possible to realize the same operation and effects as those in the fifth exemplary embodiment.

According to this exemplary embodiment described above, even when the unlocking operation is seen by another person, it is possible to prevent the content of unlocking operations including the first operation and the second operation from being easily recognized by the other person.

Seventh Exemplary Embodiment

This exemplary embodiment is based on the second exemplary embodiment, or the third exemplary embodiment based on the second exemplary embodiment, and is an exemplary embodiment in which installation positions of the first input device and the second input device are limited.

The electronic device of this exemplary embodiment includes a casing, the first input device is provided in a first surface of the casing, and the second input device is provided in a second surface of the casing. Also, the first surface and the second surface have a relationship of front-and-back.

An example is illustrated in FIG. 10. FIG. 10(A) is a plan view of a first surface of the electronic device 10, and FIG. 10(B) is a plan view of a second surface of the electronic device 10. The first surface and the second surface have a relationship of front-and-back. The electronic device 10 is a portable terminal that can beheld with one hand.

A touch panel display 11A (a second input device) is provided on the first surface, and a touch sensor 11C (a first input device) that identifies whether touch is performed is provided on the second surface.

The lock unit 12 unlocks the lock if the input reception unit 11 receives an input caused by a predetermined operation through the touch panel display 11A (the second input device) in a second operation in a state in which the input reception unit 11 receives an input caused by the first operation to continue to touch the touch sensor 11C (the first input device).

For example, the operator can perform the first operation to continue to touch the touch sensor 11C (the first input device) with a finger of one hand (the left hand or the right hand) while holding the electronic device 10 with the hand.

Also, the operator can perform the predetermined input operation (the second operation) through the touch panel display 11A (the second input device) with the predetermined object (for example, the finger of the hand) while maintaining the first operation.

When there is the touch sensor 11C (the first input device) in a position as illustrated in FIG. 10(B), for example, the operator can perform a first operation to continue to touch the touch sensor 11C (the first input device) with the index finger of the left hand while holding the electronic device 10 with the left hand.

In the example, the operation and effects described in the second and third exemplary embodiments are realized. Further, since the first operation can be performed with the hand holding the electronic device 10, it is possible to make it further difficult for the presence of the first operation OPI to be noticed by the third party.

Further, in the example, the first input device may be another device, such as a button, instead of the touch sensor 11C. When the first input device is the button, the first operation is, for example, an operation to continue to press the button.

Figure 11:
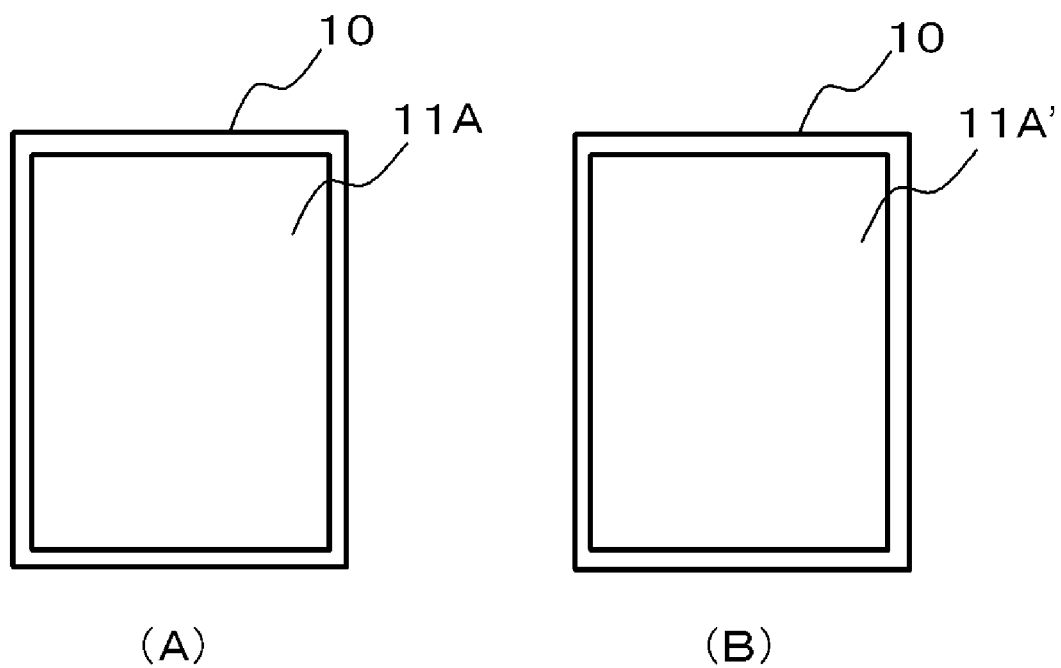
FIGS. 11(A)-(B) show an example of a schematic plan view of the electronic device of this exemplary embodiment.
Figure 12:
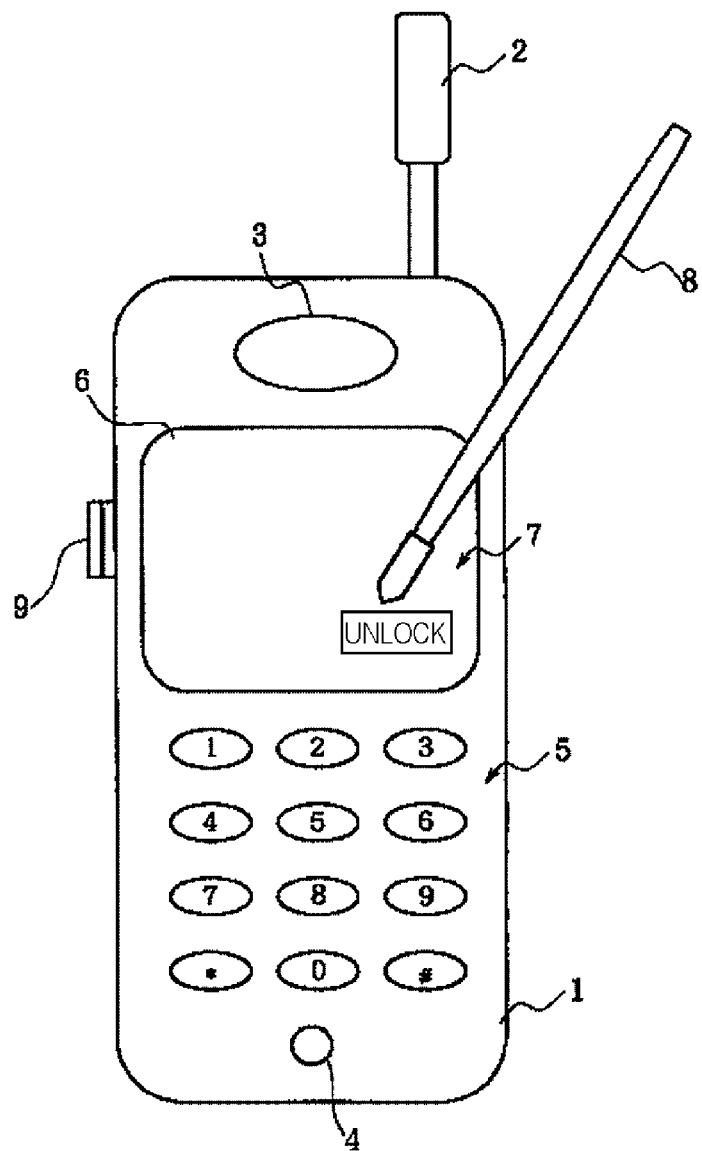
FIG. 12 is a diagram illustrating a conventional example.

Another example is illustrated in FIGS. 11(A)-(B). FIG. 11(A) is a plan view of a first surface of the electronic device 10, and FIG. 11(B) is a plan view of a second surface of the electronic device 10. The first surface and the second surface have a relationship of front-and-back. The electronic device 10 is a portable terminal that can be held with one hand.

A touch panel display 11A (a second input device) is provided on the first surface, and a touch panel display 11A' (a second input device) is provided on the second surface.

When the input reception unit 11 receives an input caused by a first operation through the touch panel display 11A' (the first input device) and an input caused by a second operation through the touch panel display 11A (the second input device) in parallel, the lock unit 12 unlocks a lock.

In the example, it is possible to adopt the third to sixth exemplary embodiments. That is, a combination of the first operation and the second operation can be a combination described in these exemplary embodiments. Further, in the third to the sixth exemplary embodiments, the first operation and the second operation are performed with respect to one touch panel display, whereas in the case of the present exemplary embodiment, any one of the first operation and the second operation is performed with respect to each of two touch panel displays. Further, the configuration of the lock unit 12 can be the configuration illustrated in the third to sixth exemplary embodiments. For example, there are a plurality of combinations of the input content of the first operation and the input content of the second operation for unlocking the lock.

In the example, the operation and effects described in the second and third exemplary embodiments are realized. Further, it is possible to realize the operation and effects described in the third to sixth exemplary embodiments by adopting a combination of the first operation and the second operation or the configuration of lock unit 12 described in the third to sixth exemplary embodiments.

Further, the exemplary embodiment is also applicable to the large electronic device 10 so as to stably perform the touch operation with the one hand while holding the electronic device 10 with that hand described using FIGS. 3(A)-(D).

According to this exemplary embodiment described above, even when the unlocking operation is seen by another person, it is possible to prevent the content of unlocking operations including the first operation and the second operation from being easily recognized by the other person.

<<Supplement>>

According to the above-described description, the following description of the invention is given.

<Invention 1>

An electronic device including:

an input reception unit that receives an input through an operation to indicate a predetermined region using a predetermined object; and a lock unit that locks a predetermined function, and unlocks the lock when the input reception unit receives an input caused by a first operation and an input caused by a second operation in parallel.

<Invention 2>

An electronic device, including:

an input reception unit that receives an input through a first input device and a second input device provided in positions which are not simultaneously visible; and a lock unit that locks a predetermined function, and unlocks the lock when the input reception unit receives an input caused by a first operation through the first input device and an input caused by a second operation through the second input device in parallel.

<Invention 3>

The electronic device according to invention 1, wherein a border between the predetermined region to be indicated by the first operation and another regions is invisible.

<Invention 4>

The electronic device according to invention 1 or 3, wherein the first operation is an operation to indicate the predetermined region and then to maintain an indication position without moving the indication position, and the second operation is a predetermined operation performed in a state in which the indication position is maintained in the first operation.

<Invention 5>

The electronic device according to invention 4, wherein the lock unit unlocks the lock if first information is input by the second operation when the input reception unit receives the input caused by the first operation to maintain an indication of a first predetermined region, and unlocks the lock if second information different from the first information is input by the second operation when the input reception unit receives the input caused by the first operation to maintain the indication of a second predetermined region different from the first predetermined region.

<Invention 6>

The electronic device according to invention 4, wherein the lock unit unlocks the lock if first information is input by the second operation when the input reception unit receives the input caused by the first operation to maintain an indication of the predetermined region using a first object, and unlocks the lock if second information different from the first information is input by the second operation when the input reception unit receives the input caused by the first operation to maintain an indication of the predetermined region using a second object different from the first object.

<Invention 7>

The electronic device according to any one of inventions 1, and 3 to 6, wherein the operation is an operation performed by touching a predetermined region in a touch region.

<Invention 8>

The electronic device according to invention 2, including:
a casing,
wherein the first input device is provided in a first surface of the casing, the second input device is provided in a second surface of the casing, and the first surface and the second surface have a relationship of front-and-back.

<Invention 9>

The electronic device according to any one of inventions 1 to 8,
wherein the first operation is a static operation, and the second operation is a dynamic operation.

<Invention 10>

The electronic device according to any one of inventions 1 to 9,
wherein when the lock unit receives the input caused by the first operation and the input caused by the second operation in parallel in time series, the lock unit unlocks the lock.

<Invention 11>

A program for causing a computer to function as:
an input reception unit that receives an input through an operation to indicate a predetermined region using a predetermined object; and
a lock unit that locks a predetermined function, and unlocks the lock when the input reception unit receives an input caused by a first operation and an input caused by a second operation in parallel.

<Invention 11-2>

A program for causing a computer to function as:
an input reception unit that receives an input through a first input device and a second input device provided in positions which are not simultaneously visible; and
a lock unit that locks a predetermined function, and unlocks the lock when the input reception means receives an input caused by a first operation through the first input device and an input caused by a second operation through the second input device in parallel.

<Invention 11-3>

The program according to invention 10,
wherein a border between the predetermined region to be indicated by the first operation and another region is invisible.

<Invention 11-4>

The program according to invention 11 or 11-3,
wherein the first operation is an operation to indicate the predetermined region and then to maintain an indication position without moving the indication position, and
the second operation is a predetermined operation performed in a state in which the indication position is maintained in the first operation.

<Invention 11-5>

The program according to invention 11-4,
wherein the program causes the lock unit to:
unlock the lock if first information is input by the second operation when the input reception unit receives the input caused by the first operation to maintain an indication of a first predetermined region, and
unlock the lock if second information different from the first information is input by the second operation when the input reception unit receives the input caused by the first operation to maintain the indication of a second predetermined region different from the first predetermined region.

<Invention 11-6>

The program according to invention 11-4,
wherein the program causes the lock unit to:
unlock the lock if first information is input by the second operation when the input reception unit receives the input caused by the first operation to maintain an indication of the predetermined region using a first object, and
unlock the lock if second information different from the first information is input by the second operation when the input reception unit receives the input caused by the first operation to maintain an indication of the predetermined region using a second object different from the first object.

<Invention 11-7>

The program according to any one of inventions 11, and 11-3 to 11-6,
wherein the operation is an operation performed by touching a predetermined region in a touch region.

<Invention 11-8>

The program according to invention 11-2,
wherein the first input device is provided in a first surface of a casing, the second input device is provided in a second surface of the casing, and the first surface and the second surface have a relationship of front-and-back.

<Invention 11-9>

The program according to any one of inventions 11 to 11-8,
wherein the first operation is a static operation, and the second operation is a dynamic operation.

<Invention 11-10>

The program according to any one of inventions 11 to 11-9,
wherein when the lock unit receives the input caused by the first operation and the input caused by the second operation in parallel in time series, the lock unit unlocks the lock.

<Invention 12>

An unlocking method in which a computer executes:
an input reception step of receiving an input through an operation to indicate a predetermined region using a predetermined object; and
an unlocking step of locking a predetermined function, and unlocking the lock when an input caused by a first operation and an input caused by a second operation are received in parallel in the input reception step.

<Invention 12-2>

An unlocking method in which a computer executes:
an input reception step of receiving an input through a first input device and a second input device provided in positions which are not simultaneously visible; and
an unlocking step of locking a predetermined function, and unlocking the lock when an input caused by a first operation through the first input device and an input caused by a second operation through the second input device are received in parallel in the input reception step.

<Invention 12-3>

The unlocking method according to invention 12,
wherein a border between the predetermined region to be indicated by the first operation and another region is invisible.

<Invention 12-4>

The unlocking method according to invention 12 or 12-3,
wherein the first operation is an operation to indicate the predetermined region and then to maintaining an indication position without moving the indication position, and
the second operation is a predetermined operation performed in a state in which the indication position is maintained in the first operation.

<Invention 12-5>

The unlocking method according to invention 12-4, wherein the unlocking step includes:

unlocking the lock if first information is input by the second operation when the input caused by the first operation to maintain an indication of a first predetermined region is received in the input reception step, and unlocking the lock if second information different from the first information is input by the second operation when the input caused by the first operation to maintain the indication of a second predetermined region different from the first predetermined region is received in the input reception step.

<Invention 12-6>

The unlocking method according to invention 12-4, wherein the unlocking step includes:

unlocking the lock if first information is input by the second operation when the input caused by the first operation to maintain an indication of the predetermined region using a first object is received in the input reception step, and unlocking the lock if second information different from the first information is input by the second operation when the input caused by the first operation to maintain an indication of the predetermined region using a second object different from the first object is received in the input reception step.

<Invention 12-7>

The unlocking method according to any one of inventions 12, and 12-3 to 12-6, wherein the operation is an operation performed by touching a predetermined region in a touch region.

<Invention 12-8>

The unlocking method according to invention 12-2, wherein the first input device is provided in a first surface of a casing, the second input device is provided in a second surface of the casing, and the first surface and the second surface have a relationship of front-and-back.

<Invention 12-9>

The unlocking method according to any one of inventions 12 to 12-8, wherein the first operation is a static operation, and the second operation is a dynamic operation.

<Invention 12-10>

The unlocking method according to any one of inventions 12 to 12-9, wherein the lock step includes unlocking the lock when the input caused by the first operation and the input caused by the second operation are received in parallel in time series.

Priority is claimed on Japanese Patent Application No. 2012-256766, Nov. 22, 2012, the content of which is incorporated herein by reference.

What is claimed is:

1. An electronic device, comprising:

an input reception unit implemented at least in hardware that receives an input through an operation performed by a user to indicate a predetermined region using a predetermined object; and a lock unit that locks a predetermined function performable via user input in relation to the electronic device, and unlocks the locked predetermined function when the input reception unit receives an input caused by a first operation and an input caused by a second operation in parallel;

wherein the first operation is an operation to indicate the predetermined region and then to maintain an indication position without moving the indication position, and the second operation is a predetermined operation performed in a state in which the indication position is maintained in the first operation.

2. An electronic device, comprising:

an input reception unit implemented at least in hardware that is adapted and configured to receive an input performed by a user through a first input device provided in a first surface of a casing and a second input device provided in a second surface of the casing, the first surface and the second surface having a relationship of front-and-back; and a lock unit that is adapted and configured to lock a predetermined function performable via user input in relation to the electronic device, and unlock the locked predetermined function when the input reception unit receives a first operation to continue to touch the first input device and a second operation through the second input device in parallel.

3. The electronic device according to claim 1, wherein a border between the predetermined region to be indicated by the first operation and another region is invisible.

4. The electronic device according to claim 1, wherein the lock unit unlocks the lock if first information is input by the second operation when the input reception unit receives the input caused by the first operation to maintain an indication of a first predetermined region, and unlocks the lock if second information different from the first information is input by the second operation when the input reception unit receives the input caused by the first operation to maintain the indication of a second predetermined region different from the first predetermined region.

5. The electronic device according to claim 1, wherein the lock unit unlocks the lock if first information is input by the second operation when the input reception unit receives the input caused by the first operation to maintain an indication of the predetermined region using a first object, and unlocks the lock if second information different from the first information is input by the second operation when the input reception unit receives the input caused by the first operation to maintain an indication of the predetermined region using a second object different from the first object.

6. The electronic device according to claim 1, wherein the operation is an operation performed by touching a predetermined region in a touch region.

7. The electronic device according to claim 2, comprising:

a casing, wherein the first input device is provided in a first surface of the casing, the second input device is provided in a second surface of the casing, and the first surface and the second surface have a relationship of front-and-back.

8. The electronic device according to claim 1, wherein when the lock unit receives the input caused by the first operation and the input caused by the second operation in parallel in time series, the lock unit unlocks the lock.

9. A non-transitory storage medium storing a program for causing a computer to function as:
- an input reception unit implemented at least in hardware that receives an input through an operation performed by a user to indicate a predetermined region using a predetermined object; and
- a lock unit that locks a predetermined function performed via user input in relation to the computer, and unlocks the locked predetermined function when the input reception unit receives an input caused by a first operation and an input caused by a second operation in parallel;
- wherein the first operation is an operation to indicate the predetermined region and then to maintain an indication position without moving the indication position, and
- the second operation is a predetermined operation performed in a state in which the indication position is maintained in the first operation.

10. A non-transitory storage medium storing a program for causing a computer to function as:
- an input reception unit implemented at least in hardware that is adapted and configured to receive an input performed by a user through a first input device provided in a first surface of a casing and a second input device provided in a second surface of the casing, the first surface and the second surface having a relationship of front-and-back; and
- a lock unit that is adapted and configured to lock a predetermined function performed via user input in relation to the computer, and unlock the locked predetermined function when the input reception unit a first operation to continue to touch the first input device and a second operation through the second input device in parallel.

11. An unlocking method in which a computer executes:
- an input reception step of receiving an input performed by a user through an operation to indicate a predetermined region using a predetermined object; and
- an unlocking step of locking a predetermined function performed via user input in relation to the computer, and unlocking the locked predetermined function when an input caused by a first operation and an input caused by a second operation are received in parallel in the input reception step;
- wherein the first operation is an operation to indicate the predetermined region and then to maintain an indication position without moving the indication position, and
- the second operation is a predetermined operation performed in a state in which the indication position is maintained in the first operation.

12. An unlocking method in which a computer executes:
- an input reception step of receiving an input performed by a user through a first input device provided in a first surface of a casing and a second input device provided in a second surface of the casing, the first surface and the second surface having a relationship of front-and-back; and
- an unlocking step of locking a predetermined function performed via user input in relation to the computer, and unlocking the locked predetermined function when a first operation to continue to touch the first device and a second operation through the second input device are received in parallel.

* * * * *